United States Patent
Pier et al.

[11] Patent Number: 5,114,571
[45] Date of Patent: May 19, 1992

[54] WATER TREATMENT SYSTEM

[75] Inventors: James M. Pier, Akron; Gary E. Starr, Clinton, both of Ohio

[73] Assignee: Water Enhancement Systems, Inc., Akron, Ohio

[21] Appl. No.: 402,622

[22] Filed: Sep. 5, 1989

[51] Int. Cl.[5] .............................................. C02F 9/00
[52] U.S. Cl. ..................... 210/96.1; 204/149; 204/150; 204/DIG. 5; 210/143; 210/223; 210/243; 210/258; 210/259; 210/512.1
[58] Field of Search ............... 210/695, 742, 743, 746, 210/748, 787, 806, 96.1, 143, 149, 223, 243, 258, 259, 512.1, 662, 669; 204/148-150, 155, 197, DIG. 5

[56] References Cited

U.S. PATENT DOCUMENTS

| | | | |
|---|---|---|---|
| 3,844,943 | 10/1974 | Duval | 210/67 |
| 3,870,033 | 3/1975 | Faylor et al. | 210/669 |
| 3,875,061 | 4/1975 | Palma | 210/512.1 |
| 4,017,390 | 4/1977 | Vicard | 210/42 R |
| 4,110,218 | 8/1978 | Marriott et al. | 210/223 |
| 4,299,700 | 11/1981 | Sanderson | 210/222 |
| 4,299,701 | 11/1981 | Garrett et al. | 210/222 |
| 4,306,967 | 12/1981 | Trautwein | 210/167 |
| 4,336,223 | 6/1982 | Hillman | 210/143 |
| 4,347,133 | 8/1982 | Brigante | 210/223 |
| 4,366,053 | 12/1982 | Lindler | 210/222 |
| 4,455,229 | 6/1984 | Sanderson et al. | 210/222 |
| 4,485,012 | 11/1984 | Ehresmann | 210/223 |
| 4,719,018 | 1/1988 | Przybylski | 210/748 |
| 4,931,187 | 6/1990 | Derham et al. | 210/662 |

Primary Examiner—Ivars Cintins
Attorney, Agent, or Firm—Reese Taylor

[57] ABSTRACT

An automatic water treatment system including a magnetic descaler, a centrifugal separator and an electrode purifier operationally connected to a water supply and controlled by a microprocessor so as to monitor conductivity, pH and copper/silver content and control the descaler, separator and purifier as well as the blowdown as required to insure acceptable levels of water purity while avoiding excessive blowdown.

8 Claims, 2 Drawing Sheets

WATER TREATMENT SYSTEM

BACKGROUND OF THE INVENTION

This invention relates in general to water treatment systems and relates in particular to a water treatment system intended, without the utilization of any chemicals, to significantly overcome the problems caused by corrosion, scale, biological growths and suspended solid matter occurring in these systems.

DESCRIPTION OF THE PRIOR ART

Pure water is virtually unobtainable in a natural environment. Moreover, water has a great capacity to dissolve other compounds and natural water will contain impurities common to the source of that water. These impurities become more concentrated in cooling tower water systems as pure water is evaporated from the system. It is, therefore, a continuing problem in systems of this type to limit the capability of the impurities to form scale and cause corrosion in the system. It is also desirable to combat the effects of biological growths and suspended solid matter. These phenomena can lead to system failure in the extreme situation but, in any event, to costly maintenance problems.

Correcting water-caused problems in cooling systems is generally considered complex and usually involves water chemistry, engineering, economics and personnel administration during system design, construction, installation and operation of the system. Nevertheless, the cooling efficiency and useful life of the system dictate that these problems be overcome.

The traditional approach to controlling the purity of the water in a system of this general type is to manipulate the water chemistry by adding additional chemicals. These chemicals, however, must be administered in precise quantities, in narrow pH bands, and in combination only with other compatible chemicals to be totally effective. This approach is thus difficult to administer. Also, blowdown discharges from cooling tower water systems utilizing chemical treatment may also create harmful effects on the environment through the sewer system. Additionally, a chemical solution to the problems set forth is costly and require stringent safety precautions with which operating personnel are not normally familiar.

There are, in the patent prior art, also other known devices and methods for combatting certain of the individual problems just discussed. However, none have been arranged in a simple efficient system such as Applicants' which combats all of them in an efficient, economical way without the undesirable side effects of the chemical approach.

For example, Lindler U.S. Pat. No. 4,366,053 discloses a descaler or magnetic device for treating streams of fluid. Sanderson U.S. Pat. Nos. 4,455,229 and 4,299,700 also disclose examples of this type of device. Descalers generally operate by directing fluid flow through alternating magnetic force fields so that the minerals in the fluid are rendered into a soft mud which can be easily removed by blowdown or flushing. This approach also forms a protective film to minimize corrosion.

Ehresmann U.S. Pat. No. 4,485,012 also discloses use of a combination of alternating current magnetic means to break down the particles in the water for the purpose of killing bacteria with direct current means being utilized to pulverize the particles and maintain them in suspension for descaling purposes.

Vicard U.S. Pat. No. 4,017,390 discloses a device for the electrostatic treatment of fluids with the fluid being subjected to electrostatic action by an electrode with a simultaneous centrifugal motion to remove floating particles.

Trautwein U.S. Pat. No. 4,306,967 shows a series of hydrocyclone separators intended to remove solids from the fluid stream. Generally, centrifugal separators are designed to remove dirt and other solid material by forcing the particles downward into a holding chamber by centrifugal action.

Garrett U.S. Pat. No. 4,299,701 discloses a magnetic descaler of a type well-known in this art, while Przybylski U.S. Pat. No. 4,719,018 discloses an ionizer of the type generally found in this art. Ionizers or electronic purifiers generally release silver and copper ions from electrodes into a solution where a proportion flocculate and are caught in a filter thereby eliminating bacteria and algae.

Other patents of general interest with regard to the purification of various fluids and liquids can be seen in Marriott U.S. Pat. No. 4,110,218 and Duval U.S. Pat. No. 3,844,943.

It is, therefore, apparent that the prior art teaches various mechanical or electrical devices which solve some of the individual system problems set forth above by Applicant. Heretofore, however, it has not been known to combine these in a unique combination and system and to uniquely control that system so as to provide, in one system, means for properly conditioning the water against corrosion, scale, biological growths and suspended solid matter without the utilization of the usual costly and environmentally dangerous chemical solutions.

SUMMARY OF THE INVENTION

It accordingly becomes a principal object of this invention to utilize electrical, mechanical and magnetic water conditioning technology in a uniquely packaged, piped and controlled system so as to properly condition cooling tower system water without the utilization of chemical additives.

Another object of the invention is to provide a completely packaged system of non-chemical water treatment which addresses the problems of scale, corrosion, algae, bacteria and dissolved solids non-chemically and automatically.

A still further object of the invention is to provide a non-chemical water treatment system which minimizes the amount of cooling tower water blowdown with an automatic control system.

A still further object of this invention is to provide a unique arrangement of piping and components which allows the assembly of a water treatment system which can be optimized with respect to size, flow and effect.

Accordingly, production of an improved water treatment system of the character above-described becomes the principal object of this invention with other objects thereof becoming more apparent upon a reading of the following brief specification considered and interpreted in view of the accompanying drawings.

OF THE DRAWINGS

BRIEF DESCRIPTION OF THE PREFERRED EMBODIMENTS

Figure 1:
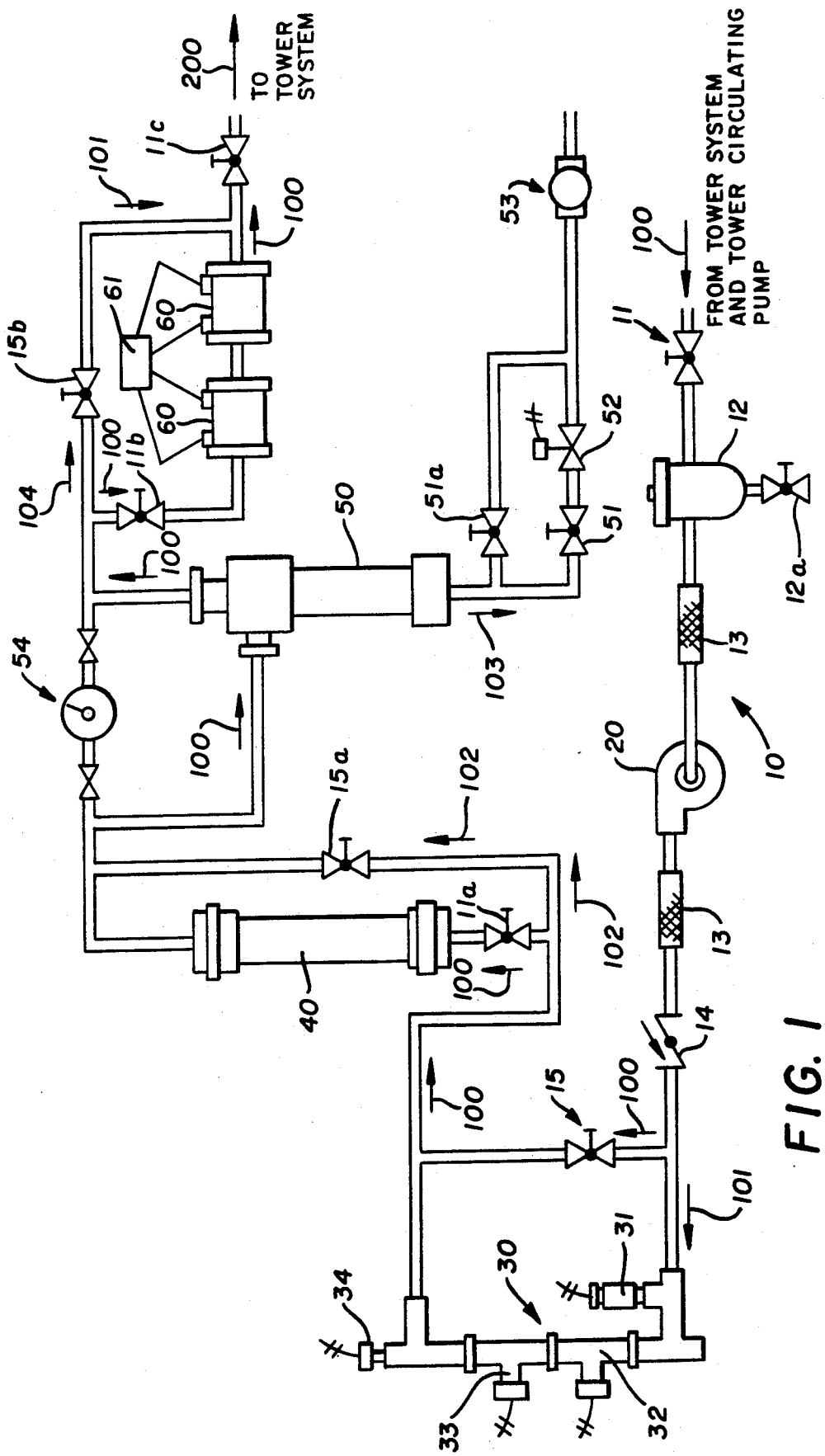
FIG. 1 is a schematic flow diagram of the invention showing the relationship of the components to each other with the bypass piping necessary to optimize component flow.

Referring to FIG. 1 of the drawings, it will be seen that the improved system, generally indicated by the numeral 10, is connected to the water tower system at its opposed ends so that water from the system can be drawn in the direction of the arrow 100 into the system and, after being treated, pass back to the tower system in the direction of the arrow 200.

With that in mind, and still referring to FIG. 1 of the drawings, it will be noted that the water is first drawn into the system by the pump 20 through an inlet valve 11. The water then passes through a basket strainer 12 which typically filters out particles larger than 1/32 of an inch in diameter. A manual blowdown valve 12a is included on the basket strainer for periodic maintenance blowdown as required.

After passing through basket strainer 12, the main flow continues in the direction of arrow 100 through the pump 20 which is bracketed by vibration eliminating connectors 13,13 of the type commonly known in the art.

At this point, it should be noted that the pipe size and the pump capacity of pump 20 is selected for the maximum flow required for any of the magnetic descaling devices, centrifugal separators or ionization devices, as will be explained. The main pipe size is selected to provide a friction drop consistent with the pump head capabilities within the water treatment stream assembly. The other various components, such as, for example, the vibration eliminating connectors just described, are "line sized" consistent with this design decision.

Turning again, then, to FIG. 1, it will be noted that the main flow in the direction of the arrow 100 passes through a check valve 14, and further through a side stream bypass valve 15 and proceeds on to the magnetic descaling device 40. A predetermined amount of water, however, passes in the direction of the arrow 101 to a secondary side stream assembly indicated by arrow 30. This side stream assembly 30 is critical to the control of the overall system. Accordingly, it includes a pH electrode 31, a conductivity electrode 32, a temperature electrode 33, and a system flow switch 34. Effectively, a control interlock is provided to energize the water treatment pump 20 and also to control the main cooling tower circulating pump. The controls will function if the water treatment circulating pump 20 has started and flow is "proved" by the system flow switch 34 which is a paddle device which will sense the water flow.

A microprocessor control system monitors water system pH through the pH electrode 31 for informational purposes only and pH electrode 31 is an optional feature not critical to the operation of the system. However, the water system total dissolved solids (TDS) is controlled through the microprocessor system by sensing system water conductivity through the conductivity electrode 32 with a temperature corrective adjustment as sensed through the temperature electrode 33. The TDS set point is user adjustable through the conventional microprocessor keypad.

Further details regarding the operation of this control system will be described in greater detail below.

After passing through the side stream bypass valve 15 and the secondary bypass stream assembly 30, the total amount of water will continue to flow in the direction of the arrow 100 and will proceed either to the magnetic descaling device 40 or its associated bypass. In other words, the water will flow in either the direction of the arrow 100 through the flow measuring valve 11a or in the direction of arrow 102 through the bypass valve 15a. The main flow of the water in the direction of the arrow 100 thus passes through the magnetic descaling device 40 which operates in conventional fashion, as previously described with regard to the prior art.

The entire system flow then passes through the centrifugal separator 50 in the direction of the arrow 100. The effectiveness of the centrifugal separator is directly related to the flow and, therefore, to the pressure drop across it. A differential pressure sensing gauge 54 is included to monitor this pressure drop for proper functionality.

Blowdown of the system can occur through the separate blowdown control valve 52 in the direction of the arrow 103. In other words, the solids separated by the separator 50 can be removed from the system in this fashion. This is controlled automatically and directed again by the system TDS control logic resident in the microprocessor, as will be described. Suffice it to say, at this point, that the solids from separator 50 are removed through the normally open manual valve 51 and the automatic blowdown control valve 52, or through the manual bypass valve 51a, and through the blowdown accumulating water meter 53 which measures the total water removed from the system during the blowdown operation. This is felt to be an important feature of the invention since it is desirable to save as much water as possible during blowdown.

The water which has been treated by the centrifugal separator 50 continues in the direction of the arrow 100 to the ionizing devices 60,60 through valve 11b or their associated bypass assembly through the bypass valve 15b in the direction of the arrow 104. The quantity of ionizing devices is dependent on both the capacity of the device and the volume and nature of the water treated.

The ionizing devices again are conventional in nature and operate in a conventional fashion as previously described.

The water thus having passed through the descaling device 40, centrifugal separator 50 and the ionizing devices 60,60 will be returned to the tower system through a flow measuring type balance valve 11c and in the direction of the arrow 200. This valve is also equipped with a memory stop to allow shut-off and return to a balanced position.

Figure 2:
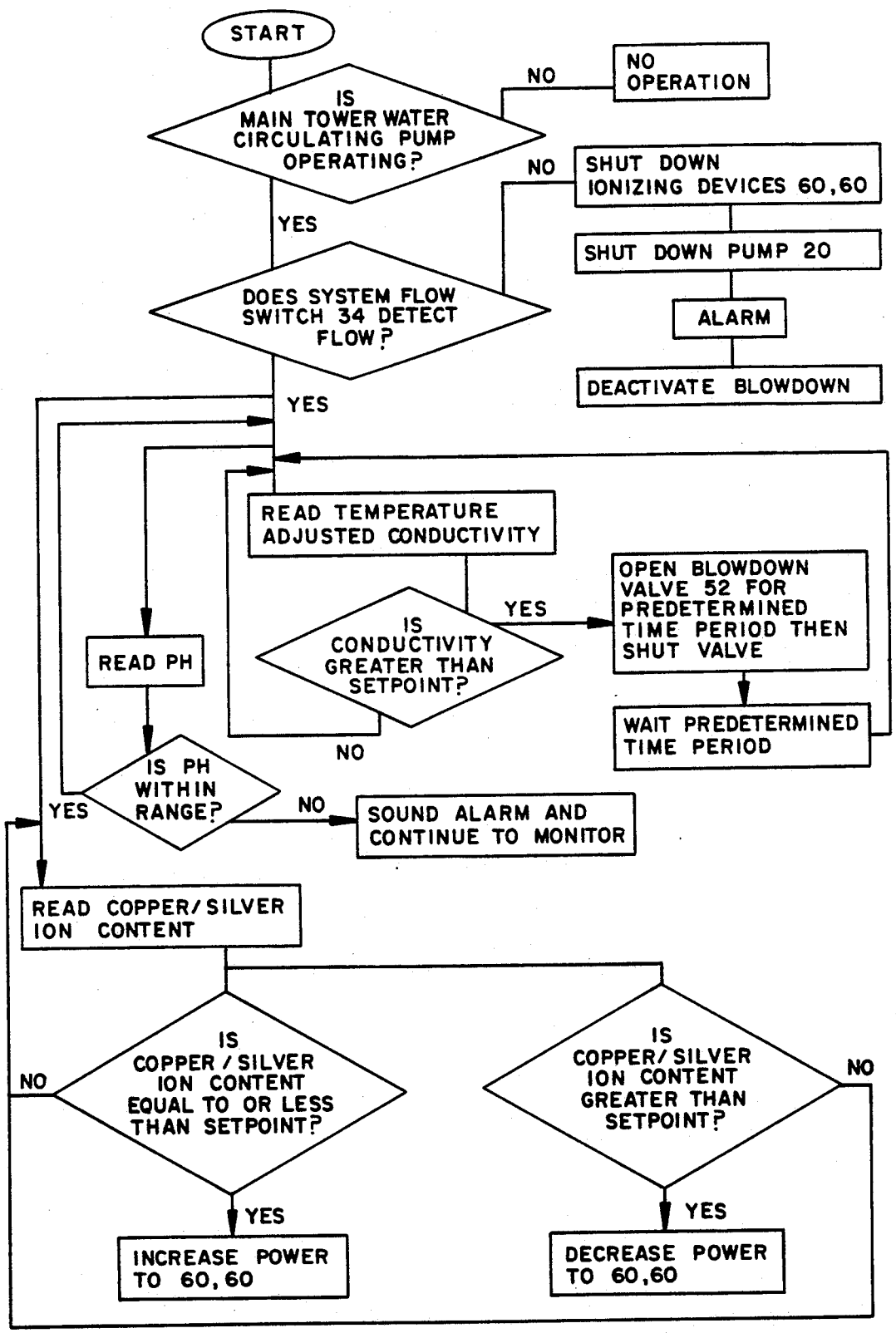
FIG. 2 is a flow chart showing the operation of the system.

Referring to FIG. 2 and returning then to the operation of the system flow switch 34, as previously indicated, the pump 20 is proved as to operation and flow by this switch. With water flow present, when a water system TDS above the previously determined set point is sensed by reading the conductivity, the microprocessor control system will cause the blowdown control valve 52 to open for a maximum period of time. That period of time is, of course, adjustable to meet predetermined criteria and it will be noted that this is not on a time basis, but rather is based solely on system conditions.

Without this feature, the system inertia would cause the blowdown water to become excessive. The microprocessor will check the system TDS again after a predetermined period of time and repeat the blowdown cycle if the TDS criteria are met to optimize system blowdown. This differs from conventional practice wherein the blowdown is on a timer which results in wasteful excessive blowdown.

Specifically, for example, in a one thousand (1000) gallon system, the separator 50 normally contains only one or two gallons. Unless blowdown control valve 52 is constantly open which is undesirable, a long period of time is required to cause a reaction as sensed by conductivity electrode 32. Therefore, excessive blowdown is avoided. It should also be noted that while separator 50 is continuously extracting solids, in a typical installation with a set point of X, the conductivity electrode 32 will, through the microprocessor control, cause blowdown control valve 52 to open only for a predetermined time when X is exceeded. It will then close and conductivity electrode 32 will not permit it to open again for a programmable period so as to avoid excessive blowdown and waste of water.

As noted, the magnetic descaler 40 requires proper flow through it for the system to be properly served and this flow is regulated by flow measuring valve 11a and monitored by system flow switch 34. Descalers of this type are commercially available and they generally contain an alternating magnetic force field cell which affects dissolved mineral valence electrons and causes the minerals to lose their ability to form hard scale. The neutralized minerals also form a film barrier on the piping system's metal surfaces which acts as a corrosion inhibitor. The descaler requires no specific controls.

The commercially available centrifugal separator 50 effectively removes solid particles 50 microns in size and larger in a typical operation. Light particles, less than 1.20 specific gravity, will be removed by the basket strainer 12, as previously mentioned, and any strainers which might be placed in the main cooling tower piping.

The centrifugal separator 50 requires a minimum water inlet pressure and proper flow to operate properly and the differential pressure sensing gauge 54 provides for monitoring this. An improperly operating separating system will result in excessive blowdown and water usage, the avoidance of which is one of the objects of this invention.

Thus, the piping arrangement with initial manual balancing and the flow switch 34 allow for automatic assurance of this flow with a manual check being available through the differential pressure sensing gauge 54.

System algae and bacteria control is accomplished through the ionizing devices 60,60 which, with a low power input, utilize the biocidal properties of copper and silver in sufficient concentration within the system to be lethal to algae, bacteria and viruses. The ionizing devices 60,60 are commercially available, as previously noted.

The ionizing device control unit 61 delivers a low-voltage current to the electrodes housed within the flow cell. These electrodes comprise a carefully proportioned alloy of copper and silver which insure that the ions are released in the appropriate ratio to the electrolytic process. The electrodes are positioned to produce wear and corrosion when not in use, but, when activated, allow maximum penetration of the water to obtain the highest kill rate of the bacteria.

The bacteria and algae killed by the ions released gain an electrostatic charge and cling together to produce large masses which are captured by the strainer and the centrifugal separator 50.

The ionizing devices 60,60 also require water flow to operate properly and the invention protects the ionizing device with internal control circuitry through the microprocessor from the system flow switch 34. Should system flow cease, the ionizing devices will automatically be shut down. Likewise, should the ion content be sensed as greater or less than the set point, power can be increased or decreased as required.

It will thus be seen how all of the various problems usually associated with systems of this nature are combatted by the unique system described herein. This is accomplished without the need to add chemicals to the water with all of the disadvantages associated therewith. Also, the unique control of the system avoids wasteful and costly excessive blowdown.

It is contemplated that the system just described can be provided in a completely packaged system and used to retrofit existing systems or incorporated into new systems.

While a full and complete description of the invention has been set forth in accordance with the dictates of the Patent Statutes, it should be understood that modifications can be resorted to without departing from the spirit hereof or the scope of the appended claims.

Thus, as previously mentioned, this system also has, optionally, the capability of monitoring pH through electrode 31. If the pH is found to not be within the predetermined range, an alarm may be sounded but, otherwise, operation of the system continues and the pH level is continuously monitored.

What is claimed is:

1. An automatic water treatment system for treating a moving stream of water having inlet and outlet means, comprising:
   a) means for neutralizing minerals and minimizing corrosion;
   b) means for separating and removing solids disposed in fluid communication with said means for neutralizing minerals and minimizing corrosion;
   c) at least one copper/silver ionizer for controlling system algae and bacteria disposed in fluid communication with said means for separating and removing solids; and
   d) system control means disposed between the inlet and outlet means for optimizing system blowdown by monitoring total dissolved solids within the system.

2. The water treatment system of claim 1 wherein said means for neutralizing minerals and minimizing corrosion include a flow sensitive magnetic descaler.

3. The water treatment system of claim 1 wherein said means for separating and removing solids includes a centrifugal separator.

4. The system of claim 1 wherein said system control means include a microprocessor connected to a pH electrode, a conductivity electrode, a temperature electrode and a system water pump whereby temperature adjusted conductivity may be monitored and blowdown may be controlled in response to predetermined criteria.

5. An automatic water treatment system for use with a water tower cooling system, comprising:
   a) a system pump in fluid communication with the water tower supply;
   b) a magnetic descaler in fluid communication with said system pump;

c) a centrifugal separator in fluid communication with said system pump and said magnetic descaler;

d) at least one copper/silver ionizer in fluid communication with said system pump and said centrifugal separator;

e) a main blowdown valve in fluid communication with said system pump; and f) control means for operating said blowdown valve in response to system predetermined total dissolved solids conditions.

6. The system of claim 5 wherein said control means includes a flow switch for proving fluid flow and a conductivity electrode for sensing total dissolved solids in the system.

7. The system of claim 6 wherein said control means include a temperature sensing electrode.

8. An automatic water treatment system for use with a water tower cooling system for treating a moving stream of water, comprising:

a) a system pump in fluid communication with the water tower supply;

b) a magnetic descaler disposed downstream from and in fluid communication with said system pump;

c) a side stream bypass system disposed between said system pump and said magnetic descaler and including
   1) a pH electrode,
   2) a conductivity electrode for sensing total dissolved solids, and
   3) a system flow switch;

d) a microprocessor control system for controlling total dissolved solids connected to said conductivity electrode;

e) a main blowdown valve connected to said microprocessor control system and in fluid communication with said system pump;

f) a centrifugal separator disposed downstream of and in fluid communication with said magnetic descaler and with said main blowdown valve; and g) at least one copper/silver ionizer disposed downstream of and in fluid communication with said centrifugal separator and in fluid communication with the water tower cooling system.

* * * * *